(12) United States Patent
Kossanyi

(10) Patent No.: US 10,507,752 B2
(45) Date of Patent: Dec. 17, 2019

(54) DEVICE FOR COVERING A FLOOR PAN OF A MOTOR VEHICLE AND METHOD FOR PRODUCING THE DEVICE

(71) Applicant: AUTONEUM MANAGEMENT AG, Winterthur (CH)

(72) Inventor: Mathias Kossanyi, Paris (FR)

(73) Assignee: AUTONEUM MANAGEMENT AG, Winterthur (CH)

( * ) Notice: Subject to any disclaimer, the term of this patent is extended or adjusted under 35 U.S.C. 154(b) by 91 days.

(21) Appl. No.: 15/740,308

(22) PCT Filed: Jun. 29, 2016

(86) PCT No.: PCT/EP2016/065101
§ 371 (c)(1),
(2) Date: Dec. 27, 2017

(87) PCT Pub. No.: WO2017/005568
PCT Pub. Date: Jan. 12, 2017

(65) Prior Publication Data
US 2018/0186265 A1 Jul. 5, 2018

(30) Foreign Application Priority Data
Jul. 6, 2015 (EP) ..................... 15175557

(51) Int. Cl.
*B60N 3/04* (2006.01)
*B32B 5/18* (2006.01)
(Continued)

(52) U.S. Cl.
CPC ............... *B60N 3/048* (2013.01); *B32B 5/18* (2013.01); *B32B 5/32* (2013.01); *B32B 27/065* (2013.01);
(Continued)

(58) Field of Classification Search
CPC . B29C 44/12; B29C 44/1228; B29C 44/1285; B29C 44/14; B32B 3/26;
(Continued)

(56) References Cited

U.S. PATENT DOCUMENTS 8,215,451 B2 * 7/2012 Nishimura ................ B32B 3/12
181/198
2009/0269551 A1 * 10/2009 Ferlay ....................... B32B 3/00
428/158
(Continued)

FOREIGN PATENT DOCUMENTS

EP 0121947 A2 10/1984
GB 2056360 A 3/1981

OTHER PUBLICATIONS

English translation of EP 0121947; retreived on Jun. 4, 2019 via PatentTranslate located at www.epo.org. (Year: 2019).*
(Continued)

*Primary Examiner* — Jason S Daniels
(74) *Attorney, Agent, or Firm* — Lewis Brisbois Bisgaard & Smith LLP; Craig Mueller

(57) ABSTRACT

The present invention is directed to a device for at least partially covering a vehicle floor pan of a motor vehicle, comprises a carrier element made at least by a hard foam material, a vibration decoupling element made at least by a soft foam material, a surface layer to visually cover the device from the top, wherein the device has a shield element, which is made at least by a plastic material and is configured for accepting, absorbing and distributing the energy of a localized impact stress, which is applied on the device from above against the shield element. The present invention is also directed to a method for producing the device.

14 Claims, 5 Drawing Sheets

(51) Int. Cl.
*B32B 5/32* (2006.01)
*B32B 27/06* (2006.01)
*B32B 27/40* (2006.01)
*B29L 31/30* (2006.01)
*B29K 75/00* (2006.01)
*B29C 67/24* (2006.01)
*B29K 105/04* (2006.01)

(52) U.S. Cl.
CPC ............ *B32B 27/40* (2013.01); *B29C 67/246* (2013.01); *B29K 2075/00* (2013.01); *B29K 2105/04* (2013.01); *B29K 2995/007* (2013.01); *B29K 2995/0091* (2013.01); *B29L 2031/3017* (2013.01); *B32B 2266/0278* (2013.01); *B32B 2307/536* (2013.01); *B32B 2307/56* (2013.01); *B32B 2605/003* (2013.01)

(58) Field of Classification Search
CPC ........ B32B 27/065; B60N 3/04; B60N 3/042; B60N 3/048; B60R 13/08; B60R 13/0815

USPC ............................................ 296/39.3, 97.23
See application file for complete search history.

(56) References Cited

U.S. PATENT DOCUMENTS

| | | | |
|---|---|---|---|
| 2010/0065368 A1* | 3/2010 | Tazian | B29C 43/003 181/290 |
| 2017/0240123 A1* | 8/2017 | Kossanyi | B60N 3/042 |
| 2018/0156296 A1* | 6/2018 | Alexander | B60R 13/0815 |

OTHER PUBLICATIONS

ISR/WO from PCT application PCT/EP2016/065101, dated Sep. 22, 2016.

* cited by examiner

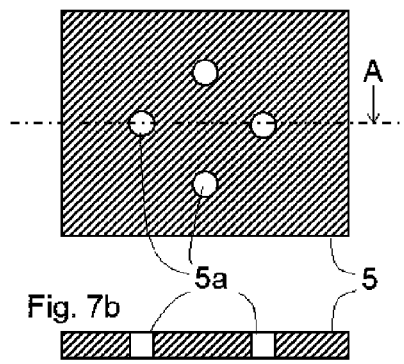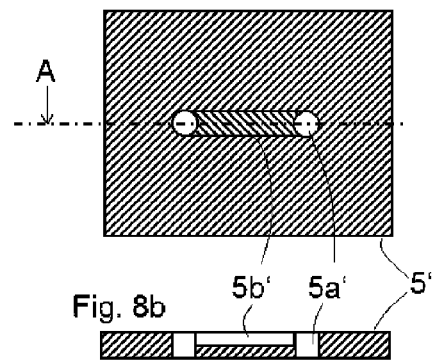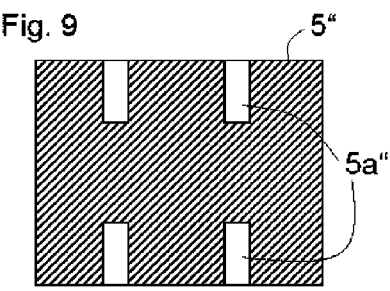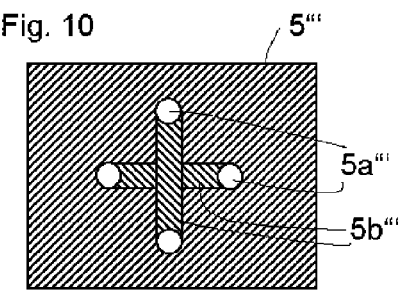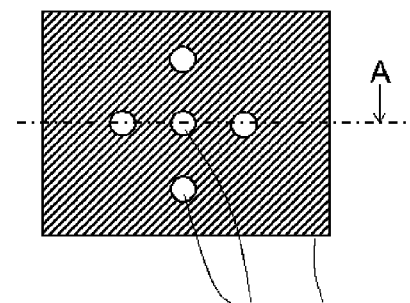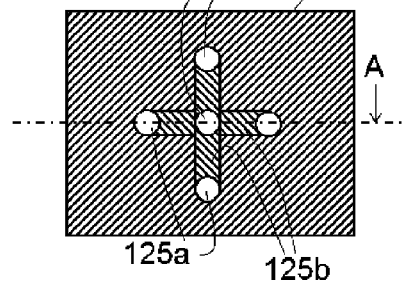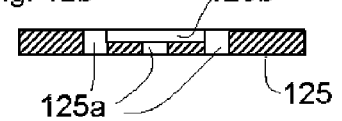

DEVICE FOR COVERING A FLOOR PAN OF A MOTOR VEHICLE AND METHOD FOR PRODUCING THE DEVICE

CROSS REFERENCE TO RELATED APPLICATIONS

This application is a national stage application under 35 U.S.C. 371 and claims the benefit of PCT Application No. PCT/EP2016/065101 having an international filing date of Jun. 29, 2016, which designated the United States, which PCT application claimed the benefit of European Patent Application No. 15175557.6, filed Jul. 6, 2015, the disclosure of each of which are incorporated herein by reference.

TECHNICAL FIELD

The present invention is directed to a device for at least partially covering a vehicle floor pan of a motor vehicle and method for producing the device.

BACKGROUND ART

In the car industry, such devices for covering a floor pan fulfil several functions. Any unevenness of the vehicle floor pan should be evened out by the device for providing a flat surface layer, which is used to support the feet of the passengers. The noise, which is emitted by the floor pan, should be dampened in a sufficient quality and quantity. Moreover, such a device should be possibly light-weight and be producible in a cost-efficient manner. Therefore, such devices are usually adapted to at least meet the requirements of a predetermined technical specification list, which is provided by a car producer for the producer of the device. Typical devices for covering a floor pan are adapted to meet the requirement for providing sufficient mechanical loading capacity for carrying the feet of passengers. The device of the present invention should be able to have another specific property, which is the capability to accept, absorb and distribute the energy of a localized impact stress, which is applied on the device from above against the device. Such a case typically occurs when the backrest of a rear-facing baby seat, which is mounted on a car seat or car bench, e.g. by an ISOFIX system, has to be supported by a stand on the floor device for guaranteeing the positioning of the baby seat even in the case of a car crash. In a car crash, a localized impact stress will act on the floor device at the position, where the backrest is supported on the floor by a stand or socket. Normal devices for supporting the feet of passengers, which are not configured to withstand the impact forces, would deform under the extreme forces of a localized impact stress and would not fulfil the safety requirements.

SUMMARY OF THE INVENTION

It is the object of the present invention to provide a device for at least partially covering a vehicle floor pan of a motor vehicle and method for producing the device, wherein the device has a loading capacity to sufficiently withstand an increased mechanical load.

The problem is solved by the device of claim 1 and the method according to claim 13. Preferred embodiments are subject matters of the dependent claims and can be derived from the present description of the invention and the drawings.

The device according to the invention for at least partially covering a vehicle floor pan of a motor vehicle, comprises a carrier element made at least by a hard foam material, a vibration decoupling element made at least by a soft foam material, a surface layer to visually cover the device from the top, wherein the device has a shield element, which is made at least by a plastic material and is configured for accepting, absorbing and distributing the energy of a localized impact stress, which is applied on the device from above against the shield element.

The implementation of a shield element containing a plastic material in combination with a carrier element containing the hard foam material offers substantial improvement of the mechanical stability of the device against localized impact stress, which is applied on the device from above against the device. The device and the shield element are configured to accept the impact energy, which means that other components of the device, e.g. the carrier element, are protected from being directly and fully hit by the impact. The shield element absorbs a part of the impact energy, e.g. by being configured to deform by a limited amount under a predetermined maximum impact load. Additionally, the shield element is configured to distribute a part of the impact load to the carrier element, which is achieved in particular by providing a sufficiently stable carrier element and a sufficiently large support region of the carrier element, where the shield element is supported and carried by the carrier element. The shield element distributes the localized impact load, originating from a smaller impact area, to a larger support area at the carrier element. Compared to conventional devices, the device according to the invention may have a slightly increased mass due to the use of the highly resistive shield element. However, the additional mass also may be beneficial because such a shield element may additionally contribute to the mass of a vibration decoupling system, which is configured as a mass-spring system, wherein the sound absorbing element acts as the spring, the shield element thereby improving the sound insulating properties of the device.

The carrier element contains at least a hard foam material or substantially consists from said material. The hard foam material can be open-cell, and is preferably closed-cell.

The hard foam material, preferably, is a low density cellular material for instance at least one of expanded polypropylene (EPP), expanded polyethylene (EPE), expanded polystyrene (EPS) or a mixture of EPS and EPE, commercially known as Piocelan, or rigid polyurethane (rigid PUR) or a combination of these materials. The hard foam material, preferably, is a polystyrene foam, and preferably is expanded polystyrene foam (EPS). Such a material is rigid and sufficiently stable under mechanical load, e.g. when receiving the energy distributed by the shield element.

The carrier element, preferably is an integral part, but may also be composed of separate parts, which are preferably interconnected to form the carrier element. The carrier element may have a substantially planar plate section, which provides an appropriate support for a substantially planar shield element. However, the plate section may at least in part deviate from an ideally planar shape. The plate section may have at least one opening or recess, which may reduce the weight. Moreover, an opening may be configured to form a support frame, which acts as a support region for supporting the border region of a shield element. Preferably, the carrier element has projections, which extend preferably vertically downward from the plate section, with an empty space between the projections, which may be partly filled with the soft foam material, in particular the soft foam material of the vibration decoupling element. Such a setup provides sufficient light-weight to the device and sufficient mechanical loading capacity. The projections may also be hollow, and may, in particular be formed as domes, i.e. the projections have a substantially conical shape, which preferably tapers downward in the direction of the floor pan.

The projections, in particular domes, are preferably evenly spread over the entire surface of the device that would be in contact with the floor pan. By using this shape the contact to the floor pan and the overall weight distribution would be more evenly spread. The dome shape used is preferably a low pitched, shallow dome that is described geometrically as having a circular base and a segmental section. In addition a dome shape is less critical in the fitting of the floor covering on the floor pan. The conical feet have a straight and narrow surface area where the part is in contact with the floor pan. A miss match of the feet with the floor will cause the floor pan to wobble. In case of the dome shaped protrusion the shape will easier follow slight differences due to its shape.

The vibration decoupling element contains at least a soft foam material or is substantially consists from said material. The soft foam material can be closed-cell, and is preferably open-cell, which improves the sound absorbing properties. The soft foam material, preferably, is polyurethane foam (PUR foam). For instance, polyurethane foam with a density between 30 and 90 kg.m$^{-3}$ is used for the soft foam material. Such a foam has the benefit of providing superior flow properties when flowing along the carrier element in a process of producing the vibration decoupling element by a reaction injection moulding process step. The vibration decoupling element may be an integral part or may be composed of separate parts. The vibration decoupling element, in particular the whole device, may be produced by a one-step foam reaction injection moulding process. Preferably, the soft foam material of the vibration decoupling element covers the carrier element at least in part, or preferably substantially completely surrounds at least a part of—or substantially completely—the carrier element and/or the shield element. Preferably, the soft foam material of the vibration decoupling element covers at least the bottom section of the carrier element, which is configured to face and contact the floor pan. This way, the vibration decoupling element acts as the spring in a mass-spring sound insulation system.

The device may have exactly one shield element or, if required, more than one shield element. The shield element contains a plastic material or substantially consists from said material, which provides the required impact loading capability. The plastic material may be a thermoplast, in particular polypropylene (PP), polyester, e.g. polyethylene terephthalate (PET) or polybutylene terephthalate (PBT), or polyamide, e.g. PA6 or PA66. The plastic material may contain a filler, which may provide additional mechanical stability to the shield element. Such a filler may be or may contain talcum, which improves stiffness in terms of the E-Modulus, the thermal conductivity, the impact strength and chemical resistance of the plastic material, which is particularly beneficial for the present purpose to resist an impact load. For example, PP T20 is appropriate to be used for the shield element. The filler may also be or may contain fibers, e.g. short fibers, thereby forming a fiber-reinforced plastic material. Such fibers may be glass fibers. Glass fiber-reinforced plastic, in particular glass fiber-reinforced polypropylene, has improved dimensional stability, resistance to warpage, rigidity and strength. For example, PP-GF50 or PA-GF50 are appropriate to be used for the shield element.

The shield element may be a plate or contain a plate, e.g. a plate section. Such a plate preferably is planar. The shield element may be arranged at least in part or substantially completely between the carrier element and the surface layer. The shield element may be arranged at least in part or substantially completely within a receiving space inside the carrier element. The shield element may be supported in direct contact with the carrier element or in indirect contact, wherein in the latter case another layer of material, e.g. parts of the sound absorbing element, may be disposed between the shield element and the carrier element, as long as the carrier element receives the major part of an impact energy, distributed by the shield element. A border region of the shield element may be supported by at least one support region of the carrier element. The border region and/or the at least one support region may be reinforced by an additional reinforcement material, e.g. a metal part or metal frame, preferably aluminium.

The shield element may include a rib section, which may form a plate or plate section of the shield element. The rib section may also be provided in addition with a plate, in particular integrally formed with the latter. The rib section may comprise a plurality of ribs, which. Preferably, are interconnected to form a grid layer or grid structure, e.g. a grid layer. The grid may be basically tetragonal, trigonal, hexagonal or cubic. This way, additional stiffness and mechanical loading capability is provided to the shield element.

The mechanical loading capability against an impact stress can be tested using the following method, for example: an impact socket is placed on top of the device according to the invention or on top of the shield element of the device. The contact area between the socket and the target is 80 mm×80 mm or a circle with a 90 mm diameter. A pressure cylinder is pressed from atop against the socket, e.g. using a mandrel screw spindle. The pressure system should be capable to increase the load from zero to a maximum load value within a short time period, in order to simulate an impact load. The time period, during which a constant maximum load is applied, is preferably 100 milliseconds (ms), wherein the force my initially continuously increase, e.g. during a ramp of 25 ms, before reaching the maximum load value, and may subsequently continuously decrease, e.g. during a rampe of 60 ms, before reaching again zero pressure. The maximum load value is between 650 and 900 deca-Newton (daN) and is preferably 700 daN or 800 daN. The shield element and/or the device, preferably, is configured to withstand an impact load between 600 daN and 900 daN, in particular of 700 daN or 800 daN. The measurement system should be capable of monitoring the maximum deflection of the target, e.g. the shield element or the surface layer of the device. This can be achieved by a optically monitoring using a high-speed camera. The specification of the shield element may include that the deflection does not exceed a predetermined displacement value of the deflected target. Such a displacement may be, e.g. 40 mm or 50 mm. This way, it can be guaranteed that the backrest of a baby seat, including the baby or child, would be sufficiently supported by the device including the shield element.

Preferably, at least the carrier element and the shield element, preferably also the carpet, are connected by the soft foam material, which forms the vibration decoupling element. However, said components may also be interconnected or adhered differently. A sheet member may be placed under the carpet, which in particular is a tufting carpet or a nonwoven carpet, in order to prevent bleeding-through of the soft foam raw material of the vibration decoupling element during a step of reaction injection molding. To prevent foam strike through in the top surface layer, an additional sheet member, e.g. a fibrous nonwoven or textile layer, can be placed under the surface layer. This additional layer should be chosen such that the foam will be hampered in its flow. Preferably this layer is one of a polyester or polyolefin, polypropylene or polyethylene, nonwoven. The layer can be made of staple fibres or of continuous filament material. Binder can be used when necessary.

Preferably, the shield element is placed above the upper side of the carrier element and supported by the same in case of the impact. This way, the full height of the carrier element can be used to withstand the impact. Preferably, the shield element is supported by parts of the carrier element, which are positioned beneath the shield element, thereby supporting also central regions of the shield element. However, it is also preferred that only a border region of the shield element is supported by the carrier element. The shield element may partly or fully be inserted inside the carrier element or inside the volume, which is delimited by the surface enveloping the carrier element. Thereby, the device becomes more compact.

Preferably the shield element has a border section, which is supported by at least one support region of the carrier element.

Preferably, the shield element has at least one passage section configured for allowing the soft foam material to pass through at least a part of the shield element during production of the device. This allows to more homogeneously and efficient distribute the foam raw material through the shield element and/or to connect the shield element at least with the vibration decoupling element.

Preferably, the carrier element has at least one passage section, which is preferably vertically aligned with the at least one passage section of the shield element. This way, the foam can be distributed through both, the barrier element and the shield element, which is useful, in particular, during a one-step reaction injection molding process.

Preferably, the carrier element has at least one empty compartment, i.e. air filled compartment, which is accessible for being entered by the soft foam material during production of the device. Such an empty compartment has the advantage that the foam can enter and expand inside the empty compartment, thereby partly or completely filling the compartment, and the foam is also allowed to degas inside the compartment. This improves the flow of the foam material during production and improves the homogeneity of the material setup forming the device. Preferably, the carrier element has at least one empty compartment, which has at least one opening being accessible for being entered by the soft foam material during production of the device.

Preferably, the carrier element has at least one empty compartment, which is closed at the bottom and has at least one opening at the top being accessible for being entered by the soft foam material during production of the device. This way, the foam may be guided from the top, potentially connecting the surface layer and/or the shield element with the vibration decoupling element, to degas inside the empty compartment.

Preferably, the shield element is at least in part covering and/or closing the at least one empty compartment. Preferably, the shield element has at least one passage section, e.g. an opening, e.g. a through-hole, which is vertically aligned with the at least one empty compartment, in particular with an opening or passage section of the carrier section. Preferably, the at least one second passage section of the shield element and the at least one empty compartment are configured to allow the soft foam material pass the second passage section and to at least partially enter the empty compartment during production of the device, wherein the empty compartment, in particular, serves as a degassing space for the soft foam material.

Preferably, the at least one passage section of the carrier element, the at least one passage section of the shield element, the at least one second passage section of the shield element and the at least one empty compartment are configured to allow the soft foam material to pass the at least one passage section of the carrier element, the at least one passage section of the shield element, the at least one second passage section of the shield element and to at least partially enter the empty compartment during production of the device, wherein the empty compartment, in particular, serves as a degassing space for the soft foam material.

Preferably the shield element has at least one integrated protrusion that aligns with at least one indentation or recess in the carrier element to clip the shield element on the carrier element and to prevent it from moving during the application of the soft foam.

Preferably, the shield element is configured to serve as a support and impact zone for the support bar of a child seat in a motor vehicle, which may be mounted to the vehicle by a commercial ISOFIX system. The device may include a mounting socket for mounting the stand, which supports the child seat against floor pan via the device according to the invention.

The invention, furthermore, relates to a method for producing the device according to the invention. The method according to the invention for producing a device for at least partially covering a vehicle floor pan of a motor vehicle, comprises the steps: —providing a carrier element made at least by a hard foam material; —providing a vibration decoupling element made at least by a soft foam material; —providing a surface layer to visually cover the device from the top; providing a shield element, which is made at least by a plastic material and is configured for accepting, absorbing and distributing the energy of a localized impact stress, which is applied on the device from above against the shield element; —assembling said components for providing the device. The method, in particular may include the step of applying a reaction injection molding process to provide the vibration decoupling element, and, preferably to connect at least two or all of the components of the device.

Further embodiments of the device and the method according to the invention may be derived from the description of the embodiments shown in the figures and from the figures.

FIGURES AND FURTHER EMBODIMENTS

FIG. 7a shows a top view on the shield element, which can be used with a device according to the invention.

FIG. 7b shows a cross section of the shield element in FIG. 7a along the line A.

FIG. 8a shows a shield element, which can be used with the device according to the invention.

FIG. 8b shows a cross section of the shield element in FIG. 8a along the line A.

FIG. 9 shows the top view of a shield element, which can be used with the device according to the invention.

FIG. 10 shows the top view of another shield element, which can be used with the device according to the invention.

FIG. 11a shows the top view of another shield element, which can be used with the device according to the invention.

FIG. 11 b shows a cross section of the shield element in FIG. 11 a along the line A.

FIG. 12a shows in the top view of another shield element, which can be used with the device according to the invention.

FIG. 12b shows a cross section of the shield element in FIG. 12a along the line A.

Figure 13:
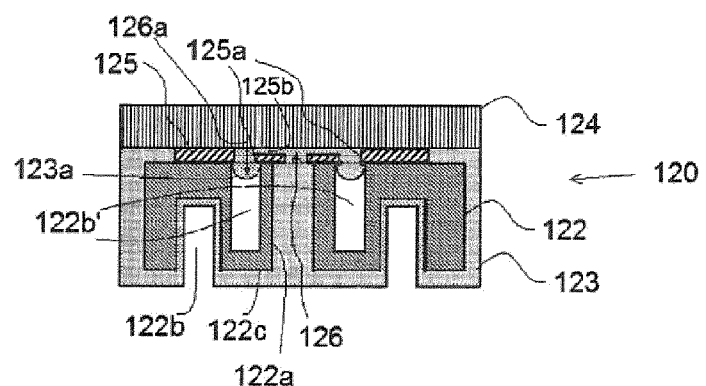

FIG. 13 shows a cross section of a device according to the seventh embodiment of the invention.

Figure 14:
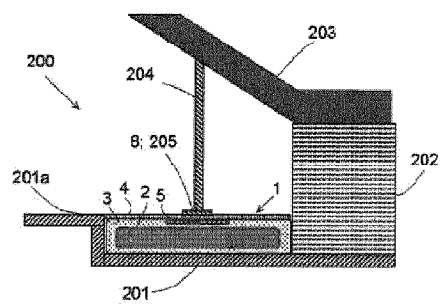

FIG. 14 shows the arrangement of a baby seat in a motor vehicle and a device according to the invention, wherein the back craft of the baby seat is supported by a stand, which is placed on the device according to the invention.

Figure 15:
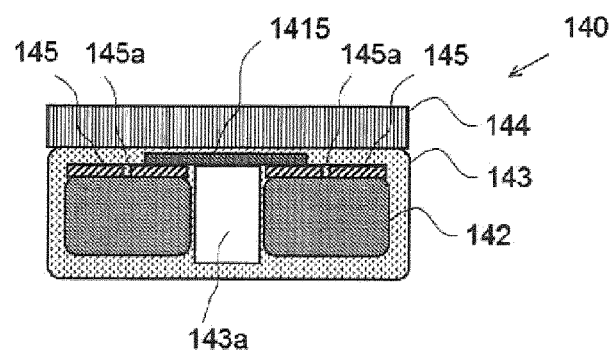

FIG. 15 shows a cross section of a device according to the eights embodiment of the invention.

Figure 16:
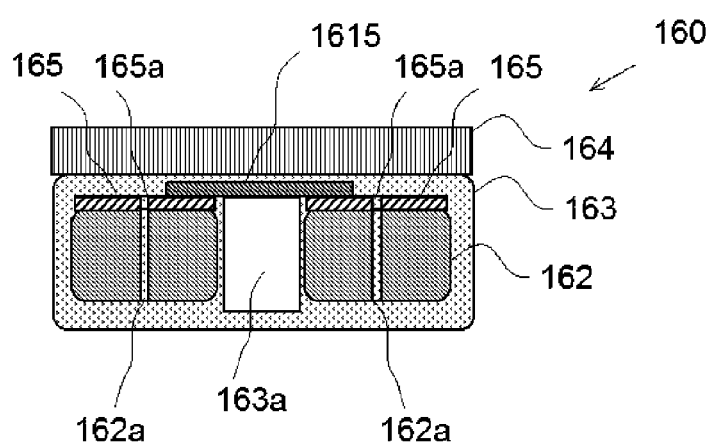

FIG. 16 shows a cross section of a device according to the ninth embodiment of the invention.

Figure 1:
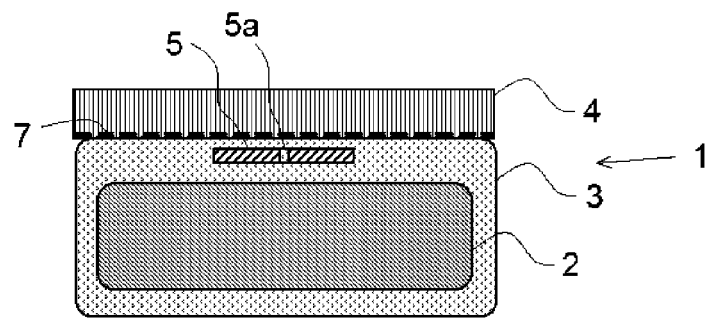
FIG. 1 shows a cross section of a device according to a first embodiment of the invention.

FIG. 1 shows the device 1 for at least partially covering a vehicle floor pan of a motor vehicle. The device 1 comprises a carrier element (2; 22, 42; 62; 82; 102; 122). In the embodiment of FIG. 1, the carrier element has the shape of substantially a rectangular plate, which is appropriate for being arranged in parallel to a vehicle floor pan of a motor vehicle. The carrier element 2 is made from a hard foam material, which is EPS, in the embodiment of FIG. 1. The device also comprises a vibration decoupling element 3, which is made from a soft foam material, in the embodiment of FIG. 1. The soft foam material is open-cell polyurethane. Such a material has sufficient sound absorbing capacities, and can be used also for the other embodiments of the device according to the invention The device 1 is covered from above by a surface layer 4, which is a carpet in the embodiment of FIG. 1. The carpet may be a tufting carpet, which may be provided with a sheet member 7, e.g. a plastic foil, which is arranged between the vibration decoupling element 3 and the surface layer 4. Such a plastic foil 7 or other sheet member may be used in order to prevent that the foam raw material, which forms the vibration decoupling element during a process of foam injection molding, would bleed through the surface layer 4 and thereby would impair the visual appearance of the device. The sheet member 7 may be provided with pores or micropores, in order to allow the air to penetrate the sheet member 7 or even to allow a predetermined amount of foam raw material 3 to penetrate the sheet member and proceed inside of the surface layer 4, without penetrating the surface layer 4.

The device 1 also has a shield element 5, which is made from a plastic material. The plastic material is polypropylene, in the embodiment of FIG. 1. The shield element 5 is—or comprises—a substantially plain plate 5, which is arranged in parallel to the carrier element 2. The plate may be or contain a grid composed of interconnected ribs. This can significantly enhance the stiffness and the loading capability of the shield element. The shield element 5 is placed above the upper side of the carrier element 2, wherein the carrier element 2 and the shield element 5 are connected with each other by the soft foam material, which forms the vibration decoupling element 3. In the present case, both, the carrier element 2 and the shield element 5, are completely surrounded by the foam material of the vibration decoupling element 3.

The shield element 5 serves for accepting, absorbing and distributing the energy of a localized impacts stress, which is applied on the device from above against the shield element 5. Typically, such a shield element is required, when the backrest of a baby seat has to be supported on the vehicle floor in the passenger compartment of a motor vehicle. For such application scenarios, a predetermined load capacity of the device is required in order to safely prevent the baby seat from leaving the mounting position inside the motor vehicle during a possible crash of the motor vehicle.

Furthermore, the shield element 5 has the technical function of serving as a mass element for the vibration decoupling system, which is represented by the device for covering the vehicle floor pan of a motor vehicle. The shield element 5 serves as the mass in a mass-spring-system, which is realized by such a vibration decoupling system, because the mass density of the shield element 5 is significantly higher than the mass density of the soft foam element 3, which forms the spring in the mass-spring-system.

The shield element 5 has one passage section 5a, which is configured for allowing at least a certain amount of the soft foam material to pass inside or through the shield element 5 during the production of the device. The passage section 5a is a cylindrical opening here, which extends vertically from the bottom side to the top side of the shield element, thereby forming a through-hole in the shield element. During the foam injection molding process, the foam raw material penetrates the hole 5a and connects the surface layer 4 with the shield element 5 and the carrier element 2.

Figure 2:
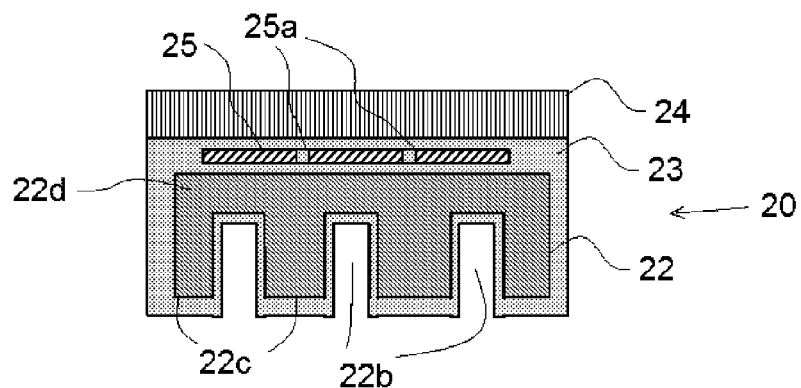
FIG. 2 shows a cross section of the device according to a second embodiment of the invention.

The device 24, for partially covering on the vehicle floor pan of a motor vehicle, shown in FIG. 2, has a carrier element 22. The carrier element 22 has a plate section 22d, which is, in the embodiment, integrally formed with projections 22c, which extend from the plate section 22d vertically downwards. The projections 22c carry the load, which is applied on the device 20. Between the projections 22c, one or multiple empty compartments 22b are formed. Such compartments are: either, respectively, closed at all sides except their bottom side, where they are opened; or, respectively, interconnected to form an interconnected empty space between the projections 22c beneath the plate section 22d of the carrier element. Such empty compartments are typical for a false floor component, which is realized by the device of FIG. 2. The surface layer 24, which may form the visual floor in the passenger compartment of a motor vehicle, is elevated and supported by the carrier element. Such a false floor is preferably configured to even out any height differences of the underlying floor pan.

The carrier element 22 is embedded in a vibration decoupling element 23, which is made from an open-cell polyurethane soft foam material. The vibration decoupling element 23, in the embodiment of FIG. 2, substantially surrounds the hole carrier element 22 and preserves the basic shape of the same, which is formed by an upper plate, supported on projections, which extend vertically downwards. Thereby, also the empty compartments 22b are preserved, even though they may be in part or completely filled with soft foam material. The shield element 5, made from polypropylene, is placed above the upper side of the carrier element 22. The shield element 25 has two or more holes 25a, which allow the soft foam material 23 to pass through the shield element during the production of the device.

Figure 3:
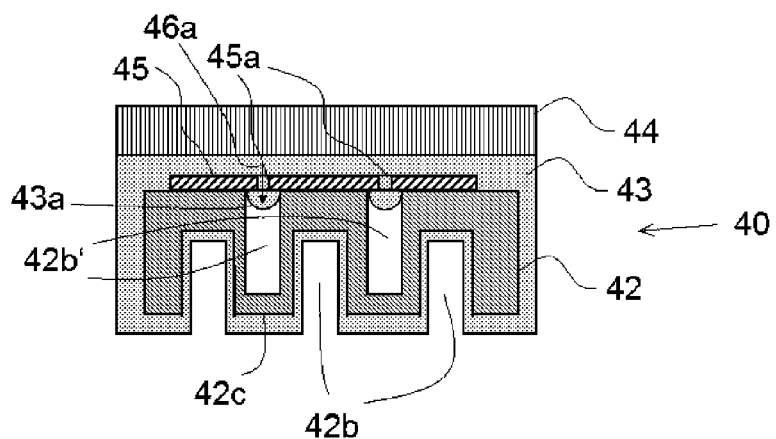
FIG. 3 shows a cross section of the device according to a third embodiment of the invention.

The device 40 for at least partially covering the floor pan of a motor vehicle, shown in FIG. 3, substantially has the same set up as the device 20 shown in FIG. 2. The carrier element 42 has a plate section, with projections 42c being connected to the plate section and extending vertically downwards therefrom. Empty compartments 42b are formed between the projections 42c. The compartments 42b are open at least at their bottom. As a difference to the device of FIG. 2, the device 40 has empty compartments 42b' which are extending from the upper side of the carrier element 24 vertically downwards inside the carrier element 42. The empty compartments 42b' are closed, except from their upper side, where they are open. The upper side faces the surface layer 44.

In the embodiment of FIG. 3, the empty compartments 42b' extend, respectively, inside one of the projections 42c, which extend vertically downward from the plate section of the carrier element 42. Thereby, at least one or a plurality of the protections 42c are hollow projections, also referred to as domes, which are filled with air and which may be in part filled with foam raw material 43a.

The empty compartments reduce the weight of the device according to the invention and reduce the amount of material, which is required to form the device. Moreover, the empty compartments 42b' allow the foam material 43a to enter the empty compartments 42b' by a certain amount 43a, wherein the foam raw material 43a is allowed to degas during the process of foam injection molding inside the empty compartments. The shield element 45 covers at least a part of the carrier element 42 and is in direct contact with the carrier element 42. The shield element 45 has a plurality of holes 45a, which are aligned with the openings at the upper side of the empty compartments 42b'. The shield element 45 respectively closes the opening of the compartments 42b'. Therefore, a hole 45a forms the only entry opening for a hollow compartment 42b' for the embodiment of FIG. 3, such that the foam raw material may pass through the holes 45a and through the opening of the upper side of the empty compartments 42b' during the foam injection molding of the device. By way of the holes 45a, the foam is allowed to reliably distribute along the shield element 45 and to connect the shield element 45 with the carrier element 42, while the soft foam material is allowed to degas inside the empty compartments 42b'.

The device 40 offers sufficient stability against impact loads, which may be directed against the shield element 45. The empty compartments 42b and 42b' contribute to the light-weight property of the device 40, wherein the carrier element 42 sufficiently supports the shield element 45, the surface layer 44, and any loads acting on the shield element 45. At the same time, the vibration decoupling element 43 provides sufficient vibration decoupling capability to the device.

Figure 4:
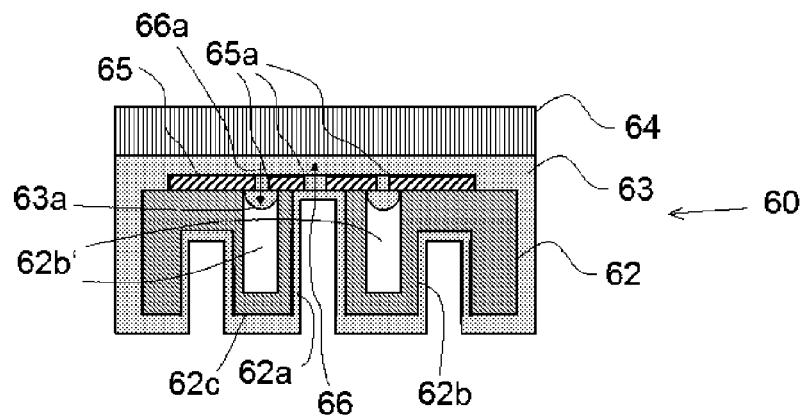
FIG. 4 shows a cross section of the device according to a fourth embodiment of the invention.

In FIG. 4, the device 60 is formed similar to the device 40 shown in FIG. 3, having a carrier element 62 with a base plate and projection 62c, empty compartments 62b opening to the bottom side and empty compartments 62b', opening to the upper side of the carrier element 62. However, in contrast to the carrier element 42, the carrier element 62 has an opening 62a, which is a through-hole extending from the bottom side of the carrier element 62 to the opposing upper side. The shield element 65 is a plain plate, in the embodiment, and covers the carrier element 62 at least in part and is in direct contact with the same. The shield element 65 follows the upper surface profile of the carrier element 62, similar to all other embodiments of the device in FIGS. 1 to 6 and 13. Thereby, the shield element 65 is supported by a possibly large contact surface at the carrier element 62.

Openings 65a of the shield element 65, formed as through-holes, are aligned with empty compartments 62b', which extend from their respective opening at the upper side of the carrier element 62 vertically downward inside the carrier element. Moreover, at least one opening 65a of the shield element is aligned with a through-hole 62a of the carrier element 62. Thereby, the foam raw material 63 is allowed to flow during the injection molding along the direction of the arrow 66 through the opening 62a and through the center hole 65a upwards, thereby reaching the area between the carpet 64 and the shield element 65. From there, the foam raw material can flow laterally and enter the empty compartments 62b' through the holes 65a of the shield element. The empty compartments 62b' act as a space reservoir and as expanding zones for the foam raw material, which is allowed to expand into the compartments along the direction of arrow 66a to form a piece of foam 63a and to degas inside the compartment. As a consequence, the layer of foam 63 between the shield element 65 and the carpet 64 is homogeneously distributed, and the carpet 64, the shield element 65 and—via the foam element 63a—the carrier element are adhered to each other by the foam 63.

The device 60 offers sufficient stability against impact loads, which may be directed against the shield element 65. The empty compartments 62b and 62b' contribute to the light-weight property of the device 60, wherein the carrier element 62 sufficiently supports the shield element 65, the surface layer 64, and any loads acting on the shield element 65. At the same time, the vibration decoupling element 63 provides sufficient vibration decoupling capability to the device.

Figure 5:
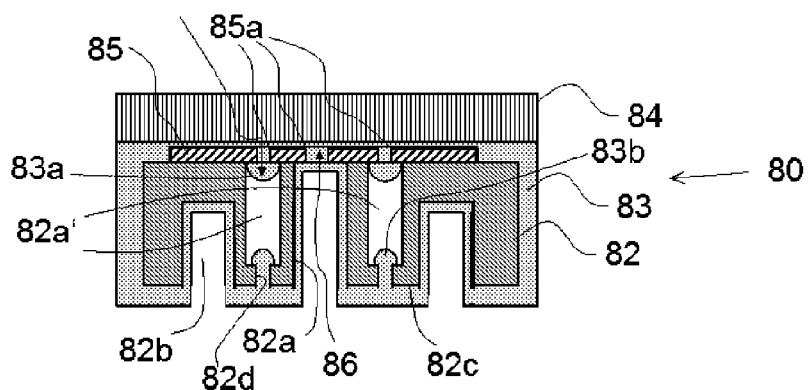
FIG. 5 shows a cross section of the device according to a fifth embodiment of the invention.

In FIG. 5, the device 80 is formed similar to the device 60 shown in FIG. 4, having a carrier element 82 with a base plate and projection 82c, empty compartments 82b opening to the bottom side and empty compartments 82b', opening to the upper side of the carrier element 82 and a through-hole 82a. However, in contrast to the carrier element 62, the empty compartments 82a' of the carrier element 82, which extend from the upper side of the carrier element 82 vertically downwards inside the protrusions 82c, have openings 82d at their bottom side, which connect the inside of the domes 82c with the bottom side of the device 80. Therefore, the compartments 82a' form an end-to-end connection between the upper side and the bottom side of the carrier element 82 and lead vertically throughout the whole height of the carrier element 82. Foam raw material 83 may pass through the openings 82d, for example from outside to inside of the domes 82c, thereby forming foam pieces 83b inside the domes, where the foam may expand and degas. The foam may also completely fill the domes 83c here (not shown). The foam piece 83b also increases the connection between the vibration decoupling element 83 with the carrier element 82 at the bottom side of the same.

The device 80 offers sufficient stability against impact loads, which may be directed against the shield element 85. The empty compartments 82b and 82b' contribute to the light-weight property of the device 80, wherein the carrier element 82 sufficiently supports the shield element 85, the surface layer 84, and any loads acting on the shield element 85. At the same time, the vibration decoupling element 83 provides sufficient vibration decoupling capability to the device.

Figure 6:
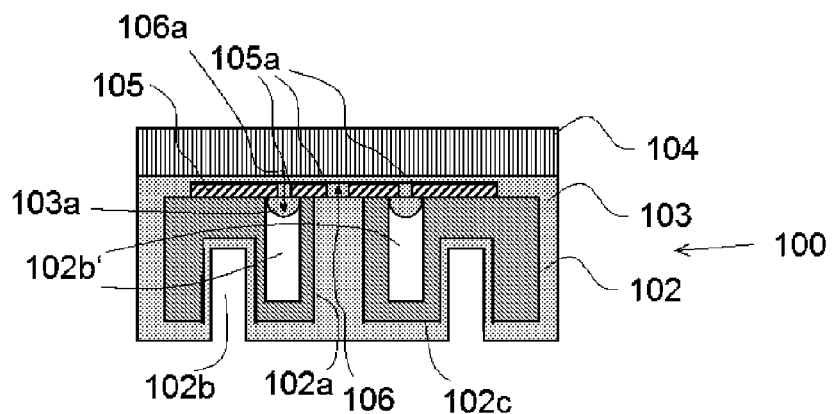
FIG. 6 shows a cross section of the device according to a sixth embodiment of the invention.

In FIG. 6, the device 100 is formed similar to the device 60 shown in FIG. 5, having a carrier element 102 with a base plate and projection 102c, empty compartments 102b, which open to the bottom side, and empty compartments 102b', which open to the upper side of the carrier element 102 and a through-hole 102a. However, in contrast to the carrier element 62, the compartment 102a of the carrier element 102, which was empty before the foam injection molding, was completely filled with foam 103. The opening 102a serves as a channel for the foam, which flows through the channel 102a vertically upwards through the hole 105a of the shield element 105, along the arrow 106, entering the space between the surface layer 104 and the shield element 105, where the foam distributes in lateral directions and enters the domes 82c along the arrow 86a, eventually expanding and degassing inside the domes 82c, and forming a foam piece 103a inside the dome, which also interconnects the carrier element 102 with the shield element 105 and the further components of the device 100.

The device 100 offers sufficient stability against impact loads, which may be directed against the shield element 85. The empty compartments 102b and 102b' contribute to the light-weight property of the device 100, wherein the carrier element 102 sufficiently supports the shield element 105, the surface layer 104, and any loads acting on the shield element 105. At the same time, the vibration decoupling element 103 provides sufficient vibration decoupling capability to the device.

FIGS. 7a and 7b shows a shield element, which may be used as a part of the device according to the invention. The shield element 5 is a simple rectangular cuboid plate, here, but may be formed different, in order to be adapted to any desired shape of a device. The shield element 5 has a number N of through-holes 5a, N=4 in the present case.

The shield element 5' in FIGS. 8a and 8b is also formed similar to be a substantially rectangular cuboid plate. It has a number N of througholes, here N=2. The shield element 5', furthermore, has a channel section 5b', which extends parallel to the plate in the upper side of the shield element 5' and which connects the through-holes by an empty space. The latter may be filled with foam raw material, which may be forced to flow from the first opening through the channel 5b' and through the second opening 5a'. The channel allows the distribution of foam raw material. This is even possible, if a—here plain—surface layer of the device is placed directly on top of the upper side of shield element 5'.

The shield element 5" in FIG. 9 is also formed to be a substantially rectangular cuboid plate. It has a number N of recesses, which form vertically oriented ports along a lateral side of the shield element 5", here N=2. Such ports allow the foam material to progress from the lateral sides of the shield element to also reach the central regions of the upper or bottom side of the shield element.

The shield element 5'" in FIG. 10 is also formed to be a substantially rectangular cuboid plate. It has a number N of recesses, which form vertically oriented ports along a lateral side of the shield element 5'", here N=4. Similar to FIG. 8a, 8b, the shield element has channel sections 5b'", which crosswise intersect at a center point and which interconnect the pairwise opposing through-holes 5a'". The channels 5b'" allows the distribution of foam raw material. This is even possible, if a—here plain—surface layer of the device is placed directly on top of the upper side of shield element 5'.

Shield element 5"" shown in FIG. 11a and 11b is similar to shield element 5 in FIG. 7a, 7b, but has an additional through-hole 5a"" in the center of a virtual cross, which has an opening 5a"" at each end of the crossbars.

Shield element 125 shown in FIG. 11a and 11b is similar to shield element 5'" in FIG. 10, but has an additional through-hole 125a in the center of a virtual cross, which has an opening 125a at each end of the crossbars. The channels 125b allows the distribution of foam raw material. This is even possible, if a—here plain—surface layer of the device is placed directly on top of the upper side of shield element 125.

Shield element 125 is used in the device 120, shown in FIG. 13. The device 120 corresponds identical to the device 100 in FIG. 6, except from the embodiment of the shield element. In FIG. 6, a shield element 5"" is used; in FIG. 13 with device 120, the shield element 125 is used, which allows to directly place shield element 125 on top of carrier element 122 in direct contact with the same. The channels 125b allows the distribution of foam raw material. This is even possible, if a—here plain—surface layer of the device is placed directly on top of the upper side of shield element 125, as is the case in FIG. 13.

The device 120 offers sufficient stability against impact loads, which may be directed against the shield element 85. The empty compartments 122b and 122b' contribute to the light-weight property of the device 120, wherein the carrier element 122 sufficiently supports the shield element 125, the surface layer 124, and any loads acting on the shield element 125. At the same time, the vibration decoupling element 123 provides sufficient vibration decoupling capability to the device.

FIG. 14 shows an arrangement 200 including a device 1 according to the invention -any other device according to the invention may alternatively used. The arrangement also may include a socket 8 and a stand 204, which rests on top of the socket. The socket 8 is placed on top of the surface layer 4, and on top of the shield element 5. The socket may be a part of the device 1, or any device according to the invention, and may be connected to the device. Alternatively, the socket may not be a part of the device, but may be a separate part, which may also be connected to the stand 204. The stand 204 serves to safely support the backrest of a baby seat 203, which is also partly supported by a rear bench seat 202 or a co-driver's seat 202 of a motor vehicle. The baby seat may be connected in the car via a commercial ISOFIX system. The device 1, and any other device according to the invention, is preferably configured to be used as a support for the stand of a babyseat, as shown in FIG. 14.

The device 1, furthermore, is also adapted to balance height differences between the floor pan 201 and with adjacent sections 201a of the floor pan, which have increased height.

In FIG. 15, the device 140 for at least partially covering a vehicle floor pan of a motor vehicle, comprises a carrier element 142 made at least by a hard foam material, a sound dampening element 143 made at least by a soft foam material, a surface layer 144 to visually cover the device from the top, wherein the device has a shield element 145, which is made at least by a plastic material and is configured for accepting, absorbing and distributing the energy of a localized impact stress, which is applied on the device from above against the shield element. The shield element 145 has a first section with through-hole 145a, which is deposited at least in part vertically above the first section of the carrier element 142. The shield element 145 has a second section with through-hole 145a, which is deposited at least in part vertically above the second section of the carrier element 142. The first and second sections of the shield element 145 may be separate parts or may be an integral part, having an opening at the position of the empty recess 143a. Between the first section of the carrier element and the second section of the carrier element, there is the empty recess 143a, which may be designed for receiving any additional components of the device or of a vehicle, e.g. cables. An additional shield element 1415, e.g. made at least in part or completely from plastic, covers the empty recess 143a and is supported by the first and second sections of the shield element 145, wherein the additional shield element 1415 is configured for accepting, absorbing and distributing the energy of a localized impact stress, which is applied on the device from above against the shield element, in combination with shield element(s) 145.

In FIG. 16, a similar embodiment compared to FIG. 15 is shown, with corresponding reference signs. Here, the first and second sections of the carrier element 162 has through-holes 162a, respectively aligned with through-holes 165a of the first and second sections of the shield element 165, wherein the through-holes serve to let the foam raw material pass during the process of foam injection molding, thereby connecting the components of the device 140, 160.

In FIG. 15, the device 140 for at least partially covering a vehicle floor pan of a motor vehicle, comprises a carrier element 142 made at least by a hard foam material, a sound dampening element 143 made at least by a soft foam material, a surface layer 144 to visually cover the device from the top, wherein the device has a shield element 145, which is made at least by a plastic material and is configured for accepting, absorbing and distributing the energy of a localized impact stress, which is applied on the device from above against the shield element. The shield element 145 has a first section with through-hole 145a, which is deposited at least in part vertically above the first section of the carrier element 142. The shield element 145 has a second section with through-hole 145a, which is deposited at least in part vertically above the second section of the carrier element 142. The first and second sections of the shield element 145 may be separate parts or may be an integral part, having an opening at the position of the empty recess 143a. Between the first section of the carrier element and the second section of the carrier element, there is the empty recess 143a, which may be designed for receiving any additional components of the device or of a vehicle, e.g. cables. An additional shield element 1415, e.g. made at least in part or completely from plastic, covers the empty recess 143a and is supported by the first and second sections of the shield element 145, wherein the additional shield element 1415 is configured for accepting, absorbing and distributing the energy of a localized impact stress, which is applied on the device from above against the shield element, in combination with shield element(s) 145.

In FIG. 16, a similar embodiment compared to FIG. 15 is shown, with corresponding reference signs. Here, the first and second sections of the carrier element 162 has through-holes 162a, respectively aligned with through-holes 165a of the first and second sections of the shield element 165, wherein the through-holes serve to let the foam raw material pass during the process of foam injection molding, thereby connecting the components of the device 140, 160.

The invention claimed is:

1. A device adapted for at least partially covering a vehicle floor pan of a motor vehicle, comprising:
   a carrier element made of at least a hard foam material;
   a vibration decoupling element made of at least a soft foam material;
   a surface layer to visually cover the device from the top;
   a shield element made of at least a plastic material and configured for accepting, absorbing, and distributing the energy of a localized impact stress applied on the device from above and against the shield element; and
   wherein the shield element has at least one passage section configured for allowing the soft foam material to pass through at least a part of the shield element during production of the device.

2. The device according to claim 1, wherein at least the carrier element and the shield element are connected by the soft foam material of the vibration decoupling element.

3. The device according to claim 1, wherein the shield element is placed above an upper side of the carrier element and supported by the same.

4. The device according to claim 1, wherein the shield element has a border section supported by at least one support region of the carrier element.

5. The device according to claim 1, wherein the carrier element has at least one passage section that is vertically aligned with the at least one passage section of the shield element.

6. The device according to claim 1, wherein the carrier element has at least one empty compartment configured to receive the soft foam material during production of the device.

7. The device according to claim 6, wherein the shield element is at least in part covering the at least one empty compartment.

8. The device according to claim 6, wherein the at least one passage section of the shield element includes a second passage, and wherein the at least on passage section of the shield element and the at least one empty compartment are configured to allow the soft foam material pass the second passage section to at least partially enter the empty compartment during production of the device, and wherein the empty compartment serves as a degassing space for the soft foam material.

9. The device according to claim 1, wherein the at least one passage section of the carrier element, the at least one passage section of the shield element, and the at least one empty compartment are configured to allow the soft foam material to subsequently pass at least one passage section of the carrier element, at least one passage section of the shield element, then a channel section of the shield element, then at least one second passage section of the shield element, and to at least partially enter the empty compartment during production of the device, and wherein the empty compartment serves as a degassing space for the soft foam material.

10. The device according to claim 1, wherein the shield element comprises at least two passage sections, which extend substantially vertical through the shield element, and at least one channel section, which extends substantially non-vertically along the shield element, and which connects the at least two passage sections.

11. The device according to claim 1, wherein the shield element is configured to serve as a support and impact zone for the support bar of a child seat in a motor vehicle.

12. A method of using the device according to claim 1 for supporting the stand of a child seat in a motor vehicle.

13. A method for producing a device for at least partially covering a vehicle floor pan of a motor vehicle, comprising:
   providing a carrier element made at least by a hard foam material;
   providing a vibration decoupling element made at least by a soft foam material;
   providing a surface layer to visually cover the device from the top;
   providing a shield element, which is made at least by a plastic material and is configured for accepting, absorbing, and distributing the energy of a localized impact stress applied on the device from above against the shield element, wherein the shield element has at least one passage section configured for allowing the soft foam material to pass through at least a part of the shield element during production of the device; and assembling said components for providing the device.

14. The method according to claim 13, including the step of applying a reaction injection molding process to provide the vibration decoupling element, and to connect at least two or all of the components of the device.

* * * * *